United States Patent
Ratakonda et al.

(10) Patent No.: US 6,285,711 B1
(45) Date of Patent: Sep. 4, 2001

(54) BLOCK MATCHING-BASED METHOD FOR ESTIMATING MOTION FIELDS AND GLOBAL AFFINE MOTION PARAMETERS IN DIGITAL VIDEO SEQUENCES

(75) Inventors: Krishna Ratakonda, Urbana, IL (US); M. Ibrahim Sezan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/082,456

(22) Filed: May 20, 1998

(51) Int. Cl.[7] ........................... H04N 7/18
(52) U.S. Cl. ............... 375/240.16; 375/240.15
(58) Field of Search ............ 375/240.01, 240.08, 375/240.09, 240.16, 240.17, 240.19

(56) References Cited

U.S. PATENT DOCUMENTS

| | | |
|---|---|---|
| 5,173,946 | 12/1992 | Roa . |
| 5,299,270 | 3/1994 | Tokura . |
| 5,329,599 | 7/1994 | Curry et al. . |
| 5,365,251 | 11/1994 | Denber . |
| 5,386,248 * | 1/1995 | De Haan et al. ............ 375/240.17 |
| 5,428,403 * | 6/1995 | Andrew et al. ............ 375/240.16 |
| 5,465,353 | 11/1995 | Hull et al. . |
| 5,537,494 | 7/1996 | Toh . |
| 5,552,823 * | 9/1996 | Kageyama ............ 375/240.12 |
| 5,594,504 * | 1/1997 | Ebrahimi ............ 375/240.16 |
| 5,790,206 * | 8/1998 | Ju ............ 375/240.16 |
| 6,084,912 * | 7/2000 | Reitmeier et al. ............ 375/240.16 |

OTHER PUBLICATIONS

Lee, et al., *A Fast Block Matching Algorithm Using Integral Projections*, IEEE Region 10 Conference, vol. 2, Aug. 1987.
Cain et al., *Efficient Block Motion Estimation Using Integral Projections*, University of Notre Dame, Sep., 1992.
Ogura et al., *A Cost Effective Motion Estimation Processor LSI Using a Simple and Efficient Algorithm*, IEEE, 1995.

* cited by examiner

*Primary Examiner*—Andy Rao
(74) *Attorney, Agent, or Firm*—Robert D. Varitz, PC (57) ABSTRACT

A method of estimating a motion field includes estimating a first motion vector component from a source average vector and a target average vector; displacing the search area according to the first motion vector component; and estimating a second motion vector component from the displaced search area.

17 Claims, 4 Drawing Sheets

BLOCK MATCHING-BASED METHOD FOR ESTIMATING MOTION FIELDS AND GLOBAL AFFINE MOTION PARAMETERS IN DIGITAL VIDEO SEQUENCES

FIELD OF THE INVENTION

This invention relates to the processing of digital video images, and specifically to estimating local displacement vectors and global affine parameters between two digital images. The quasi-projection matching method of the invention may be used in applications such as a) motion compensation in digital video compression system b) motion compensation in digital video conversion systems (temporal filtering) c) reconstruction of panoramic images (also called mosaics) d) motion-based video indexing and retrieval d) improved image resolution and e) image stabilization.

BACKGROUND OF THE INVENTION

The current state of the art includes two classes of techniques for estimating motion vectors between two images. The first class includes block-matching-based motion estimation techniques where individual image sample values within a source image block are matched to individual image samples within a candidate target image block. Each candidate target image block is positioned to correspond to one location in a predefined search window. Block matching-based motion estimation are widely used in today's real-time digital video compression systems.

Block matching is an important tool used in various digital video applications that require local/global correspondences between different parts of one image, or between two different images. A few of the applications which use block matching in one form or another include compression, tracking, recognition, and video content analysis. A typical full search block matching-based motion compensation system requires $2N^2(N+2S)^2$ additions/subtractions per picture element (pixel or pel), where N is the horizontal and vertical size of the source and target blocks over which matching is performed, and S defines the extent of the area (in pixel units) extending beyond the boundaries of the non-displaced target block. The size of the search domain is therefore a $(N+2S)\times(N+2S)$ pixel area. The number of operations quoted above accounts for $N^2$ subtractions and $N^2$ additions to calculate and accumulate distortion values, respectively, assuming that distortion is given by the sum of absolute pixel value differences (the actual number of additions is $N^{2-1}$; for simplicity, it is assumed that the actual number of additions is $N^2$). This number accounts for the number of visited positions in the search domain which is equal to $(N+2S)^2$. Computation may be reduced to some extent by using a hierarchical approach:

Coarse block matching is performed on a small version of the image, obtained with some form of multi-resolutional analysis, followed by fine block matching with a much smaller search area on the original image.

The second class of techniques for estimating motion vectors between two images 15 includes integral projection techniques for block motion estimation. Integral projection is a technique in which two-dimensional image array matching is replaced by matching of two one-dimensional vectors obtained by averaging image sample values horizontally and vertically, respectively. In the target block, the image block in the previous image, averaging is performed over the block plus the search area around it. In the source block, the image block in the current image, averaging is performed over the block only. Current integral projection methods suffer from limitations in estimating large displacements because vertical and horizontal components are estimated from the same $(N+2S)\times(N+2S)$ target area.

S. Cain and K. Sauer, "Efficient Block Motion Estimation Using integral projections", IEEE Visual Signal Processing Workshop, pages 258–263, September 1992 describe a technique for integral projection for block motion estimation in a video coding system. Their technique includes a multi-step approach which works as long as displacements are small. However, Cain et al. do not recognize that there are alternative approaches when the motion in the image is larger. In addition, they do not consider any extension of their concept to the problem of estimating global translational or affine motion parameters.

I. H. Lee and R. H. Park, "A Fast block matching Algorithm Using integral projections", Proceedings of TENCON 87, Vol. 2, Seoul, Korea, August 25–28, 1987, consider a fast method for doing integral projection in block matching. They propose a multi-step approach with the purpose to reduce the number of visited pixel locations. Like in the previous case, they do not consider other applications of the method. In their approach, the small displacement limitation is resolved by the fact that the integral projection they use performs averaging over the target block only. Consequently, a search is required to estimate each displacement vector as in any conventional block matching algorithm.

E. Ogura, Y. Ikenaga, Y. Iida, Y. Hosoya, M. Takashima, K. Yamashita, "A Cost Effective Motion Estimation Processor LSI Using a Simple and Efficient Algorithm", IEEE Transactions on Consumer Electronics, Vol. 41, No. 3, August 1995, consider various simplifications of the integral projection technique which involve further averaging of the column and row vectors. They also consider a general architecture which supports these simplifications as well as half-pel precision motion estimation. As in the two previous cases, they do not address other applications, and they use integral projection technique in conjunction with searching to make sure that large displacements may be estimated properly.

SUMMARY OF THE INVENTION

A method of estimating a motion field includes estimating a first motion vector component from a source average vector and a target average vector; displacing the search area according to the first motion vector component; and estimating a second motion vector component from the displaced search area.

An object of the invention is to provide an improved technique to the integral projection method.

Another object of the invention is to provide a method of estimating global motion parameters in a given motion model, such as the affine motion model or the translational motion model.

A further object of the invention is to provide a method that has a computational advantage over the block-matching based motion computation technique.

Still another object of the invention is to provide a method of motion computation that improves the accuracy of motion estimation when compared to the integral projection method.

Another object of the invention is to provide video consumer devices, such as digital video camcorders to rapidly generate motion fields with minimum hardware costs.

A further object of the invention is to provide applications for motion fields, including motion compensated compression of video sequences, velocity-tuned (temporal) filtering of video sequences and motion analysis of video content for the purpose of video indexing and retrieval.

Yet another object of the invention is to provide digital video cameras that include means for estimating global motion parameters from one digital image to another.

DETAILED DESCRIPTION OF THE PREFERRED EMBODIMENTS

The invention is referred to herein as the quasi-projection matching method. The invention offers drastic computational advantages compared to block matching-based motion estimation technique. A typical full search block matching-based motion compensation system requires $2N(N+2S)^2$ additions/subtractions per picture element (pixel), where N is the horizontal and vertical size of the source and target blocks over which matching is performed, and S defines the extent of the area (in pixel units) extending beyond the boundaries of the non-displaced target block. The size of the search domain is therefore a $(N+2S)\times(N+2S)$ pixel area. The number of operations quoted above accounts for $N^2$ subtractions and $N^2$ additions to calculate and accumulate distortion values, respectively (assuming that distortion is given by the sum of absolute pixel value differences). This number accounts for the number of visited positions in the search domain which is equal to $(N+2S)^2$. The method of the invention only requires $8(N+S)^2$ additions/subtractions. This number accounts for $N^2$ and $(N+2S)^2$ additions to compute row and column averages in the source and the target blocks, respectively.

The method requires only 2N additions/subtractions in order to calculate and accumulate distortion values associated with each of the (N+2S) possible displacements, and requires that such calculations need to be carried out twice, once along the horizontal dimension and once along the vertical dimension.

Quasi-projection matching is shown to be a better alternative when compared to projection matching in such situations where block size and search range are comparable, typically when 3x search range<block size<10x search range, i.e., 3x<N<10S. If block size<3x search range, neither method performs well. When the block size is much larger than the search area, projection matching approaches the performance of the quasi-projection matching method of the invention. It will be apparent to those of skill in the art that both projection matching and quasi-projection matching become more accurate with increases in block size for a constant size search range.

The invention improves the accuracy of the motion estimation process of the integral projection method. More specifically, current integral projection methods suffer from limitations in estimating large displacements because vertical and horizontal components are estimated from the same $(N+2S)\times(N+2S)$ target area. The method of the invention takes advantage of the fact that in most cases, one of the components, typically, the vertical displacement component, is smaller than the other component, typically, the horizontal displacement component.

The method of the invention improves accuracy of the motion estimates by 1) estimating first, the largest motion component; 2) displacing target area according to this motion component estimate; and 3) estimating next, the smaller motion component from the new target area. The first assumption is that the two blocks to be matched have most of their areas in common. This is equivalent to the assumption that the block size is much larger than the search area. In order to find the vertical component of the motion vector, the sum along the rows is determined and matched to the resulting vertically oriented one-dimensional vectors. This works only because the horizontal displacement is assumed to be small. If the horizontal displacement is large, the resulting matching process will not yield acceptable results. Put another way, large horizontal displacements lead to dissimilar horizontal projection vectors, which lead to unacceptable vertical displacement estimates. The horizontal component of the motion vector may be similarly calculated assuming that the vertical component of the motion vector is small.

The first embodiment of the invention provides a detailed description of the three step motion estimation procedure mentioned just above. A second embodiment of the invention describes an extension of the first embodiment whereby the method is used in an iterative scheme to perform motion estimation. A third embodiment of the invention describes a motion estimation system wherein the method is used to refine the estimates produced by the integral projection method. A fourth embodiment of the invention describes an extension to the first three embodiments, where the method is used in an hierarchical scheme to perform motion estimation. A fifth embodiment of the invention is an extension where the method is used as an initial step in estimating the parameters of a global motion model.

The quasi-projection matching method of the invention may be used in applications such as a) motion compensation in digital video compression system b) motion compensation in digital video conversion systems (temporal filtering) c) reconstruction of panoramic images (also called mosaics) d) motion-based video indexing and retrieval d) Improved image resolution and e) image stabilization.

In particular, the invention may be implemented in video consumer devices such as digital video camcorders to rapidly generate motion fields with minimum hardware costs. Applications for such a motion field includes motion compensated compression of video sequences, velocity-tuned (temporal) filtering of video sequences and motion analysis of video content for the purpose of video indexing and retrieval.

Additionally, the invention may be used in digital video cameras to estimate global motion parameters from one digital image to another. Consider a sequence of images stored in a digital camera where a different part of a larger scene has been captured in each image. Global motion parameters are estimated between each consecutive image in the sequence by using the quasi-projection matching technique of the invention. The resulting global motion parameters may be used to align and compose the images in order to reconstruct a panoramic view of the scene, also called a mosaic. The global motion parameters may also be used to stabilize the video sequences generated by the video camera.

Another application for the method of the invention is to reconstruct images with improved resolution. In this case, both local motion fields and global motion parameters, estimated with sub-pixel accuracy, are used to align images whose content has been subject to either global or local fractional displacements. The images are then merged to generate a larger image exhibiting improved resolution. The generation of the panoramic images may take place either in the digital camera or remotely, as in a PC.

Figure 1:
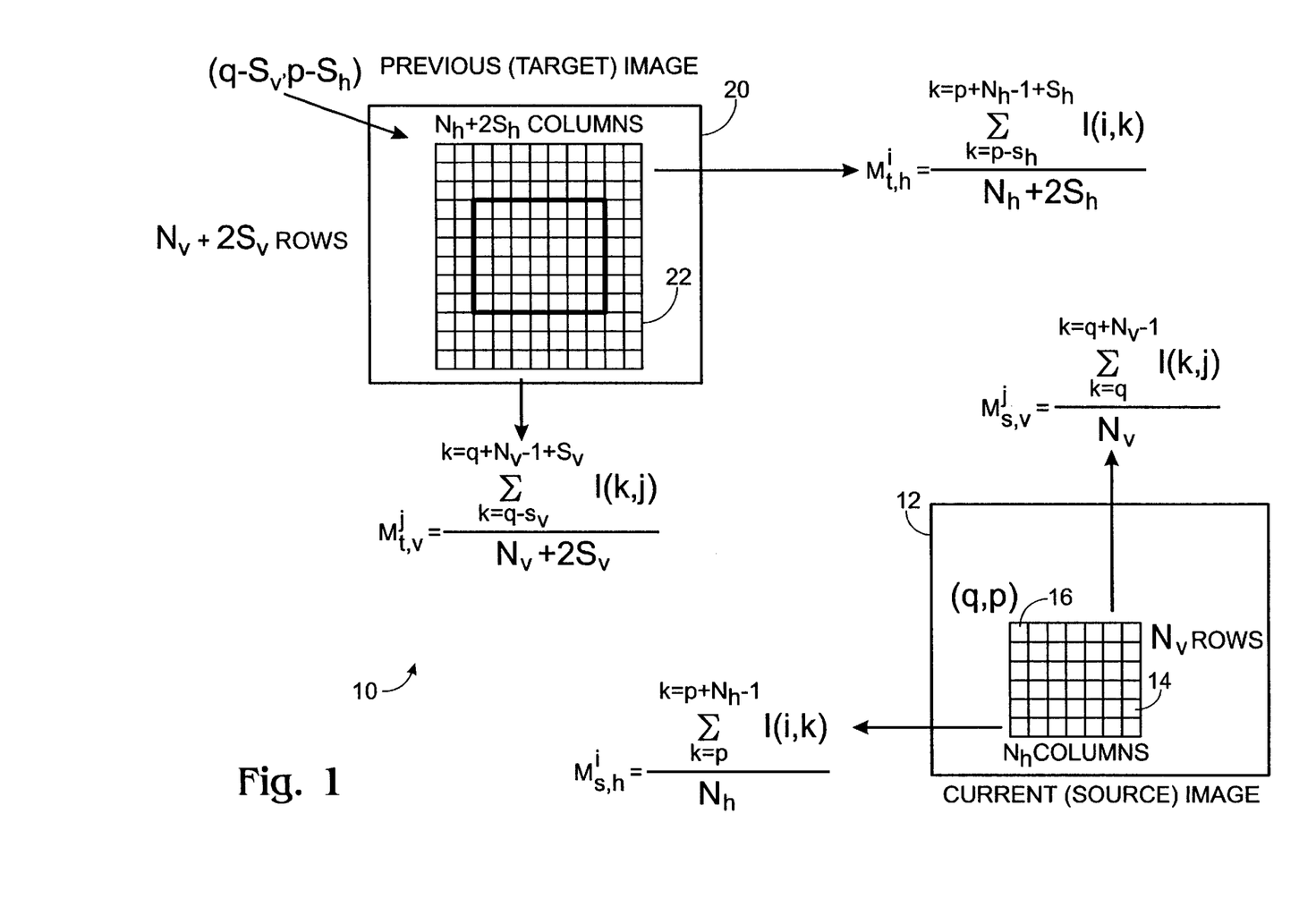
FIG. 1 is an illustration depicting the computation of averages are computed in a integral projection method.

The concept of the integral projection method (IPM) is illustrated in FIG. 1, generally at 10. Consider a current, or source, image 12 having an $N_v \times N_h$ image block 14, with $N_v$ vertical rows of pixels and $N_h$ horizontal columns of pixels, where N is the horizontal or vertical size of the source and target blocks over which matching is performed, whose upper left corner is located at pixel 16 (q,p) where q is the vertical coordinate and p is the horizontal $$m_{s,h}^i = \frac{\sum_{k=p}^{k=p+N_h-1} I(i,k)}{N_h} \quad (1)$$

coordinate. Row averages
where $q \leq i > q+N_v$, and column averages
where $p \leq j \leq p+N_h$, are calculated in the source image. This operation yields two one $$m_{s,v}^j = \frac{\sum_{k=q}^{k=q+N_v-1} I(k,j)}{N_v} \quad (2)$$

dimensional vectors, called the source row average vector and the column row average vector, with $N_v$ and $N_h$ entries, respectively. I(k,j) and I(i,k) denote image pixel values at pixel locations (k,j) and (i,k), respectively. S is the extent, or range, of search in pixel units, extending beyond the boundaries of the non-displaced target block.

Using a search area centered about the same $N_v \times N_h$ image block 22 in a target image 20 and of size $N_v+2S_v$ rows and $N_h+2S_h$ columns along the vertical and horizontal dimension, respectively, row averages $$m_{t,h}^i = \frac{\sum_{k=p-S_h}^{k=p+N_h-1+S_h} I(i,k)}{N_h+2S_h} \quad (3)$$

where $q-S_v \leq i \leq q+N_v-1+S_v$, and column averages $$m_{t,v}^j = \frac{\sum_{k=q-S_v}^{k=q+N_v-1+S_v} I(k,j)}{N_v+2S_v} \quad (4)$$

where $p-S_h \leq i \leq P+N_v-1+S_v$, are computed. This operation yields two one-dimensional vectors, called the target column average vector and the target row average vector, with $N_v+2S_v$ and $N_h+2S_h$ entries, respectively. Vertical motion is estimated by minimizing a cost function, usually the sum of the absolute difference, between the $1 \times N_v$ source row average vector and $N_v$ consecutive values in the target row average vector. Likewise, horizontal motion is estimated by minimizing a cost function between the $1 \times N_h$ source column average vector with $N_h$ consecutive entries in the target column average vector. The components of the resulting motion vector are the vertical and horizontal offset values (a value in the range $[-S_v,+S_v]$ and $[-S_h,+S_h]$, respectively) which were found to minimize the cost functions. Note that both the horizontal and vertical motion components are estimated simultaneously from the same search area in the target image.

First Embodiment

The first embodiment of the quasi-projection matching method of the invention will now be described. The term "quasi" comes from the fact that it involves estimating each motion component independently, using a different search area, as opposed to the integral projection technique where the same search area is used to estimate both motion components. Comparisons of the techniques have shown that quasi-projection matching method of the invention provides better results than integral projection when $3 \times S_v < N_v < 10 \times S_v$ and $3 \times S_h < N_h < 10 \times S_h$.

Figure 2:
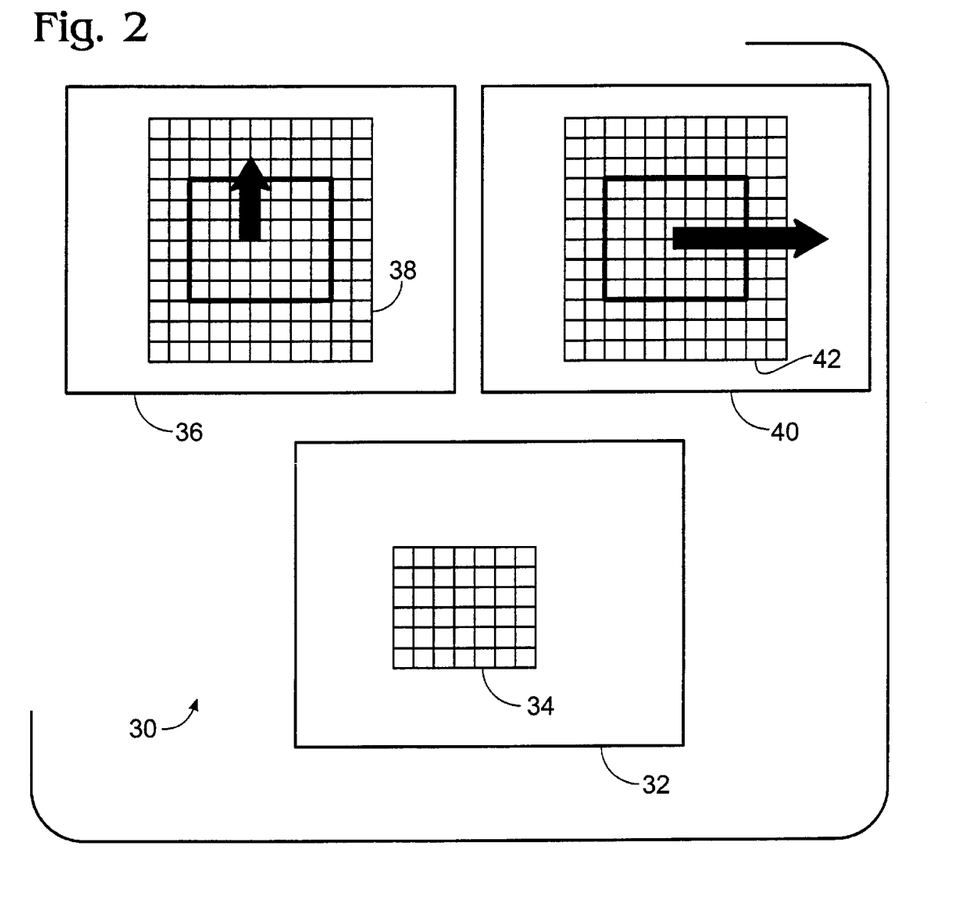
FIG. 2 is a block diagram of the quasi-projection matching method of the invention.

The first embodiment of the method for estimating a motion field includes estimating a first motion vector component from a source average vector and a target average vector; displacing the search area according to the first motion vector component; and estimating a second motion vector component from the displaced search area FIG. 2 provides an illustration of the invention first embodiment. Compared with the IPM of FIG. 1, only one, i.e., the first of the motion vector components (here the vertical component) in target image 36, having an image block 38, is estimated from the source average vector and the target average vectors (here the row average vectors) in the first iteration from source image 32, having image block 34 therein formed of plural pixels. The search area is then vertically displaced according to the estimated vertical motion. The remaining, second, motion component (here the horizontal motion) is then estimated in the second iteration in target image 40, having image block 42, once the new target average vector (here the column average vectors) has been computed.

Note that the first component to be estimated is predefined, horizontal or vertical. In digital video sequences, vertical displacements are typically much smaller than horizontal displacements, so it makes more sense in this case to estimate horizontal motion first since entries of the source and target column average vectors are minimally affected by a small vertical motion.

Second Embodiment

Alternately, the horizontal and vertical displacements may be calculated, compensating those values using the most recent horizontal displacement before calculating the vertical displacement, and vice-versa. The advantage of this technique is that better motion vectors are obtained, progressively, with each iteration, provided that the initial estimates have some validity. The search area may be reduced with each iteration, which also reduces the amount of computational effort. The horizontal and vertical projection vectors needed in the later iterations may be pre-computed using a running average in the first iteration. Thus, the computational increase amounts to an addition of two times the search dimension times the block dimension for each iteration. As used herein, an "iteration" is a computation of both horizontal and vertical displacements. Because the block dimension is typically much larger than the search dimension, the amount of computational increase is minimal. Generally, not more than two iterations are needed in most cases to achieve convergence, given that the block size is reasonably larger than the search area.

Figure 3:
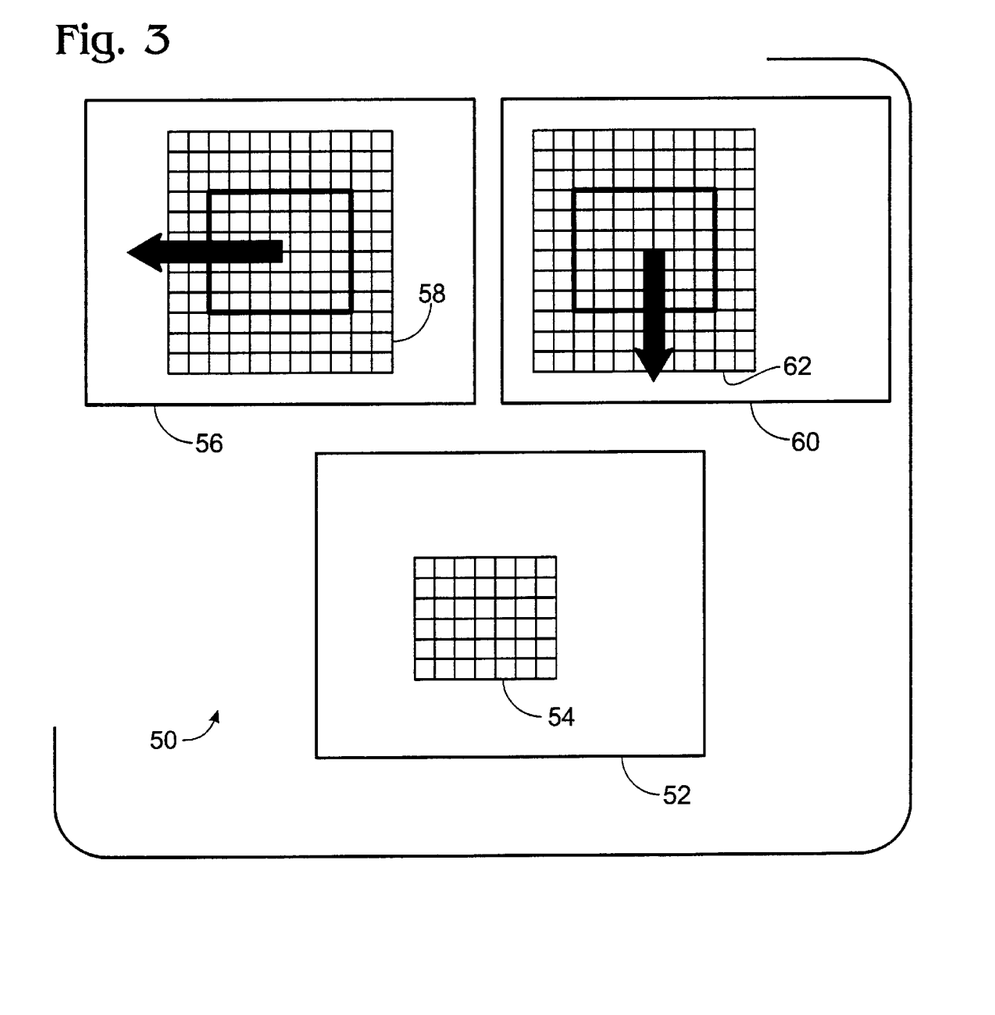
FIG. 3 is a block diagram of an alternate embodiment of the quasi-projection matching method of the invention.

FIG. 3 provides an illustration of the second embodiment of the invention, generally at 50. The beginning image is current, or source, image 52. As in the first embodiment, the identification of the first component to be estimated is pre-defined (horizontal or vertical). Since vertical displacements are typically much smaller than horizontal displacements, it makes sense again to estimate horizontal motion first. The resulting target image 56 includes an image block 58, which is the result obtained in the $1^{th}$ iteration, while the second target image 60 includes an image block 62, obtained in the $(1+1)^{th}$ iteration.

This embodiment is a modification of the first embodiment because the procedure described above is repeated a number of times. Here, vertical and horizontal displacement are alternatively estimated using quasi-projection matching after re-centering the search area according to the estimate produced by the previous iteration. Consequently horizontal and vertical displacements of the search area alternate until the process is stopped. The size of the search area may be changed from one iteration to another. For example, it is possible to reduce the size of the search area as iterations go on since motion estimates get progressively refined. FIG. 3 illustrates the case where the component estimated at the $1^{th}$ iteration is the horizontal motion component. The search area is then displaced and the vertical motion is estimated at iteration (1+1) once a new target horizontal average vector has been computed.

Third Embodiment

In this variation, both the horizontal displacement and the vertical displacement are calculated without any compensation in the first iteration, i.e., using simple projection matching. The displacement which produces the least mismatch is used to perform motion compensation before estimating the other displacement. The rest of the iterative process is similar to the method used in the second embodiment. Although, in the second embodiment, there is an inherent assumption that the displacements are approximately correct, in the situation where that assumption is not correct, the third embodiment partially remedies that situation at only a slight increase in computational burden.

Figure 4:
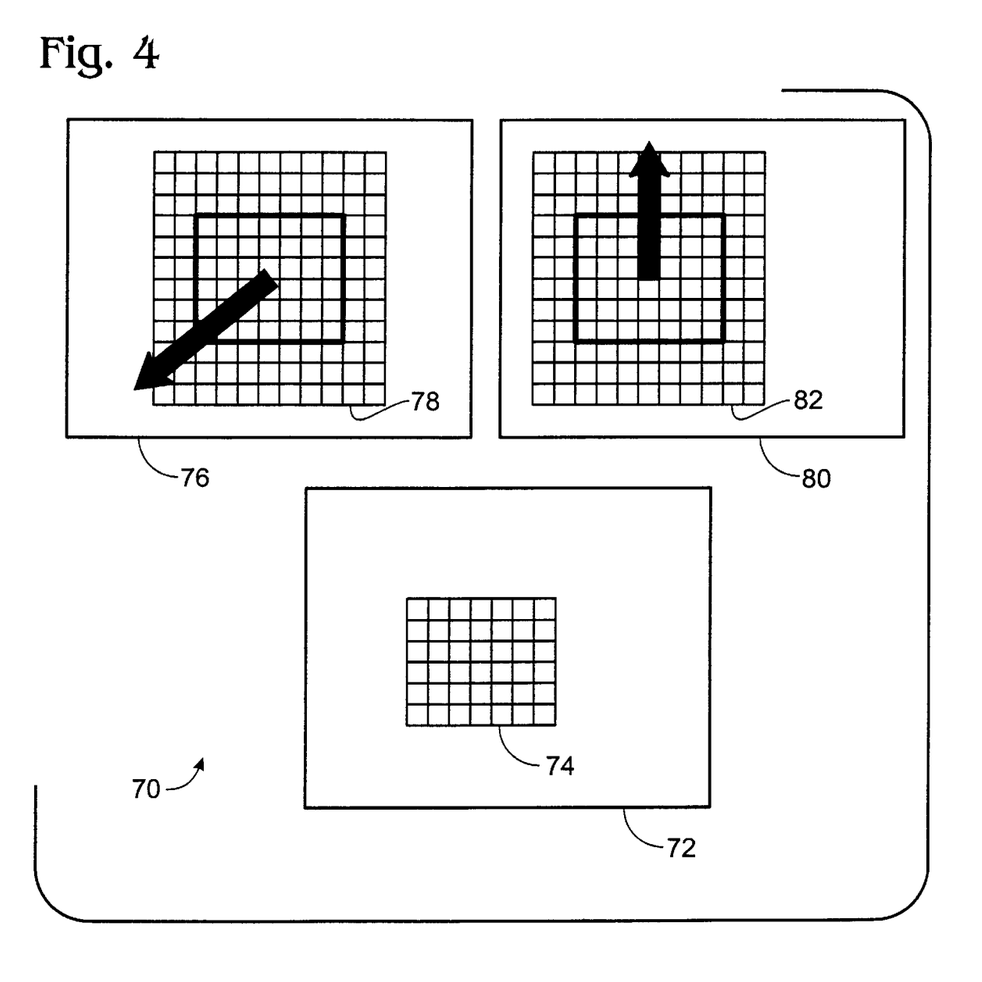
FIG. 4 is a block diagram of another embodiment of the quasi-projection matching method of the invention.

FIG. 4 illustrates the third embodiment of the invention, generally at 70. The third embodiment differs from the first and second embodiments in that the first component to be estimated, i.e., horizontal or vertical, is identified in the initial integral projection step. A source image 72 includes an image block 74. A first target image 76 includes an image block 78, obtained after the initial iteration, while a second target image 80 includes an image block 82, obtained after a second iteration.

In this embodiment, the integral projection process is used to provide an initial rough estimate of both the initial horizontal and initial vertical displacements, to provide a good initial estimate of the motion vector. The quasi-projection matching method is then used as described above. At the beginning of the first iteration, the search area is displaced according to the initial motion component which produced the best match. The example in FIG. 4 shows an initial motion vector pointing the lower left corner of the image. This vector is the motion estimate produced by the integral projection technique in the initialization step. Assume that the horizontal component is the one that yielded the best match. Therefore, before starting the second iteration, the search area is moved to the left according to the initial horizontal motion estimate. The quasi-projection matching method is then used to estimate the vertical motion component. As before, the size of the search area may be changed between one iteration and another.

The quasi-projection matching method of the invention may be designed to produce sub-pel accuracy by simply interpolating the column and row average vectors by a predefined factor. For example, half-pel motion accuracy may be achieved by interpolating the average vectors by a factor of 2. The interpolation scheme may be based on a parametric filter, i.e., cubic filter, or a conventional low-pass filter of a predetermined order. In the case of the second and third embodiments, such refinements may be performed at the final two iterations only, to refine both componenets to sub-pixel accuracy Fourth Embodiment The quasi-projection matching technique of the invention may be embedded in a hierarchical scheme. The first embodiment of the technique may be performed on images which have been spatially decimated by a factor of $2^n$, where $0 \leq n$. Once the motion estimates have been computed, they are multiplied by 2, and used to align the same two images, which are obtained from the original size images by decimation by a factor of $2^{n-1}$. This process may be repeated recursively, finally processing images at the same resolution as that of the orignal images. The hierarchical scheme may also proceed in steps larger than 1, e.g., a decimation factor of $2^{n-2}$ may be used immediately after the decimation factor of $2^n$, however, the motion vectors must be multiplied by a factor of 4 in such a situation. Likewise, the second and third embodiments may support a hierarchical scheme. The iterative process of the second and third embodiments may be combined with the hierarchical estimation scheme of the fourth embodiment. The number of iterations performed at each resolution level may be made variable. For example, one might perform two iterations at each image resolution, or one iteration at the lowest resolution, and all the other iterations at the original image resolution.

The quasi-projection matching method of the invention may also be embedded in a hierarchical scheme. For example, the first embodiment may be applied to video images which have been spatially decimated by a first predetermined decimation factor $Q^n$, where Q is a given positive integer and n is an integer greater than zero. Once the motion estimates have been computed, they are multiplied by $Q^p$, where p is an integer, selected such that 1>p<n, and used to align the same two images but decimated by a second predetermined decimation factor, $Q^{n-p}$. The process may be repeated until quasi-projection matching technique has been used across all scales including the original image resolution (n=0).

The second and third embodiments may be integrated in a hierarchical scheme in the same fashion. For example, it might be chosen to perform two iterations at each image resolution. The number of iterations may be made variable across the various image scales. In the simplest implementation of this hierarchical scheme, only one iteration is performed at each scale.

Fifth Embodiment

The fifth embodiment of the method of the invention extends the previously described embodiments. Here, the quasi-projection matching method of the invention is used to estimate parameters of a global motion model. For example, the general formulation of an affine model is $x_{t-1}=Ax_t+D$, where $x_{t-1}$ and $x_t$ represent the positions of a pixel at time t+1 and t, respectively, where A represents the transition matrix and where D represents the global translation vector.

The procedure to estimate global affine model parameters (6 motion parameters) from two consecutive images is described below.

Step 1: Estimate global translation components by using either the integral projection technique or the Quasi-Projection technique. The block size is typically large and the search area is relatively small.

Step 2: Align the two images according to the global translation estimate found in the preceding step.

Step 3: Subdivide the image into small non-overlapping blocks.

Step 4: Select blocks whose content exhibit large variations. Various techniques exist for estimating the level of variations within a block (standard deviation, sum of the absolute value after filtering the block with a high-pass filter such as the Sobel operator). A block is selected if content activity exceeds a pre-defined threshold T 1.

Step 5: Given a selected image block, apply quasi-projection matching technique (possibly with sub-pixel accuracy) to aligned images (see step 2) to produce a motion vector. The purpose of this step is to estimate the space-varying local residual displacements induced by the transition matrix A. Test projection mismatch error and discard measurement if mismatch is greater than a pre-defined threshold T2. Otherwise, add estimated residual translation to global displacement and store result.

Step 6: Count current number of stored results. Repeat step 5 if this count has not exceeded a pre-defined threshold value T3, T3>2. (At least three measurements are necessary to be able to estimate the six parameters of the affine motion model).

Step 7: Estimate global affine parameters if number of stored results is greater than T3. Estimation of the affine parameters (the matrix A and the vector D ) may be performed by calculating a Least-Square fit between the model and the motion data.

In particular, the invention may be implemented in video consumer devices such as digital video camcorders to rapidly generate motion fields with minimum hardware costs. Applications for such a motion field includes motion compensated compression of video sequences, velocity-tuned (temporal) filtering of video sequences and motion analysis of video content for the purpose of video indexing and retrieval.

Additionally, the invention may be used in digital video cameras to estimate global motion parameters from one digital image to another. Consider a sequence of images stored in a digital camera where a different part of a larger scene has been captured in each image. Global motion parameters are estimated between each consecutive image in the sequence by using the quasi-projection matching technique of the invention. The resulting global motion parameters may be used to align and compose the images in order to reconstruct a panoramic view of the scene, also called a mosaic. The global motion parameters may also be used to stabilize the video sequences generated by the video camera.

Another application for the method of the invention is to reconstruct images with improved resolution. In this case, both local motion fields and global motion parameters, estimated with sub-pixel accuracy, are used to align images whose content has been subject to either global or local fractional displacements. The images are then merged to generate a larger image exhibiting improved resolution. The generation of the panoramic images may take place either in the digital camera or remotely, as in a PC.

Although a preferred embodiment of the invention, and several variations thereof have been disclosed, it will be appreciated that further variations and modification may be made thereto without departing from the scope of the invention as defined in the appended claims.

I claim:

1. A method of estimating motion fields comprising:
    estimating a first motion vector component in a first single direction from a source average vector and a target average vector;
    displacing the search area according to the first motion vector component; and
    estimating a second motion vector component in a second single direction at 90° to the first single direction from the displaced search area.

2. The method of claim 1 which, after said displacing, includes the step of recentering the search area as a function of the previous iteration.

3. The method of claim 2 which is used in a hierarchical scheme, and which includes spatially decimating two video images by a first predetermined decimation factor; $Q^n$, deriving motion estimates; multiplying the derived motion estimates by $Q^p$; aligning, as a function of the motion estimate multiplied by $Q^p$, the original images decimating by a second predetermined decimation factor, $Q^{n-p}$, where Q is a given positive integer, n is an integer greater than zero, and p is an integer having a value between 1 and n.

4. The method of claim 2 wherein said estimating a first motion vector includes alternating horizontal and vertical displacements.

5. The method of claim 4 which is used in a hierarchical scheme, and which includes spatially decimating two video images by a first predetermined decimation factor; $Q^n$, deriving motion estimates; multiplying the derived motion estimates by $Q^p$; aligning, as a function of the motion estimate multiplied by $Q^p$, the original images decimating by a second predetermined decimation factor, $Q^{n-p}$, where Q is a given positive interger, n is an integer greater than zero, and p is an integer having a value between 1 and n.

6. The method of claim 1 which includes, prior to said estimating a first motion vector, using an integral projection process to estimate initial vertical and horizontal displacement.

7. The method of claim 6 which is used in a hierarchical scheme, and which includes spatially decimating two video images by a first predetermined decimation factor; $Q^n$, deriving motion estimates; multiplying the derived motion estimates by $Q^p$; aligning, as a function of the motion estimate multiplied by $Q^p$, the original images decimating by a second predetermined decimation factor, $Q^{n-p}$ where Q is a given positive integer, n is an integer greater than zero, and p is an integer having a value between 1 and n.

8. The method of claim 1 which further includes the steps of:
    estimating global translation components by using a technique taken from the group of techniques consisting of an integral projection technique and quasi-projection technique;
    aligning the two images according to the global translation estimate of the preceding step;
    subdividing the image into small, non-overlapping blocks;
    selecting blocks whose content exhibit large variations;
    applying a quasi-projection matching technique to a selected image block to align the images to produce a motion vector;
    evaluating a matching error for a selected image block using the produced motion vector for the image block;
    counting the number of image blocks having matching errors below a predetermined threshold value T2 and storing motion vectors for such blocks;
    estimating global affine parameters if the number of image blocks having matching errors below T2 is greater than T3>2; and
    estimating an affine parameter using the motion vectors of all image blocks having a matching error below T2.

9. The method of claim 1 which is used in a hierarchical scheme, and which includes spatially decimating two video images by a first predetermined decimation factor; $Q^n$, deriving motion estimates; multiplying the derived motion estimates by $Q^p$; aligning, as a function of the motion estimate multiplied by $Q^p$, the original images decimating by a second predetermined decimation factor, $Q^{n-p}$, where Q is a given positive integer, n is an integer greater than zero, and p is an integer having a value between 1 and n.

10. A method of estimating motion fields comprising:
   estimating a first motion vector component in a first single direction from a source average vector and a target average vector;
   displacing the search area according to the first motion vector component;
   estimating a second motion vector component in a second single direction at 90° from the first single direction from the displaced search area; and
   spatially decimating two video images by a first predetermined decimation factor; $Q^n$, deriving motion estimates; multiplying the derived motion estimates by $Q^p$; aligning, as a function of the motion estimate multiplied by $Q^p$, the original images decimating by a second predetermined decimation factor, $Q^{n-p}$ where Q is a given positive integer, n is an integer greater than zero, and p is an integer having a value between 1 and n.

11. The method of claim 10 which, after said displacing, includes the step of recentering the search area as a function of the previous iteration.

12. The method of claim 10 wherein said estimating a first motion vector includes alternating horizontal and vertical displacements.

13. The method of claim 10 which includes, prior to said estimating a first motion vector, using an integral projection process to estimate initial vertical and horizontal displacement.

14. The method of claim 10 which further includes the steps of:
   estimating global translation components by using a technique taken from the group of techniques consisting of an integral projection technique and quasi-projection technique;
   aligning the two images according to the global translation estimate of the preceding step;
   subdividing the image into small, non-overlapping blocks;
   selecting blocks whose content exhibit large variations;
   applying a quasi-projection matching technique to a selected image block to align the images to produce a motion vector;
   evaluating a matching error for a selected image block using the produced motion vector for the image block;
   counting the number of image blocks having matching errors below a predetermined threshold value T2 and storing motion vectors for such blocks;
   estimating global affine parameters if the number of image blocks having matching errors below T2 is greater than T3>2; and
   estimating an affine parameter using the motion vectors of all image blocks having a matching error below T2.

15. A method of estimating motion fields comprising:
   estimating a first motion vector component in a first single direction from a source average vector and a target average vector;
   displacing the search area according to the first motion vector component;
   recentering the search area as a function of the previous iteration;
   estimating a second motion vector component in a second single direction at 90° to the first single direction from the displaced search area;
   spatially decimating, in a hierarchical scheme, two video images by a first predetermined decimation factor, $Q^n$, deriving motion estimates; multiplying the derived motion estimates by $Q^p$; aligning, as a function of the motion estimate multiplied by $Q^p$, the original images decimating by a second predetermined decimation factor, $Q^{n-p}$, where Q is a given positive integer, n is an integer greater than zero, and p is an integer having a value between 1 and n; and
   estimating global translation components by using a technique taken from the group of techniques consisting of an integral projection technique and quasi-projection technique;
   aligning the two images according to the global translation estimate of the preceding step;
   subdividing the image into small, non-overlapping blocks;
   selecting blocks whose content exhibit large variations;
   applying a quasi-projection matching technique to a selected image block to align the images to produce a motion vector;
   evaluating a matching error for a selected image block using the produced motion vector for the image block;
   counting the number of image blocks having matching errors below a predetermined threshold value T2 and storing motion vectors for such blocks;
   estimating global affine parameters if the number of image blocks having matching errors below T2 is greater than T3;
   estimating an affine parameter using the motion vectors of all image blocks having a matching error below T2.

16. The method of claim 15 wherein said estimating a first motion vector includes alternating horizontal and vertical displacements.

17. The method of claim 15 which includes, prior to said estimating a first motion vector, using an integral projection process to estimate initial vertical and horizontal displacement.

* * * * *